(12) United States Patent
Coni et al.

(10) Patent No.: US 11,182,011 B2
(45) Date of Patent: Nov. 23, 2021

(54) TOUCH SURFACE WITH HYBRID TOUCH DETECTION

(71) Applicant: THALES, Courbevoie (FR)

(72) Inventors: Philippe Coni, Merignac (FR); Frédéric Renaud, Merignac (FR); Jean-Christophe Abadie, Merignac (FR); Siegfried Rouzes, Merignac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/898,310

(22) Filed: Jun. 10, 2020

(65) Prior Publication Data
US 2020/0409503 A1    Dec. 31, 2020

(30) Foreign Application Priority Data
Jun. 27, 2019   (FR) ...................................... 1906957

(51) Int. Cl.
*G06F 3/041*        (2006.01)

(52) U.S. Cl.
CPC .................. *G06F 3/0416* (2013.01)

(58) Field of Classification Search
CPC .... G06F 3/0416; G06F 3/04166; G06F 3/041; G06F 3/04182; G06F 3/0446;
(Continued)

(56) References Cited

U.S. PATENT DOCUMENTS

| 2010/0085325 A1* | 4/2010 | King-Smith | .......... G06F 3/0442 345/174 |
| 2015/0048846 A1* | 2/2015 | Post | ........................ G06F 3/046 324/663 |

(Continued)

FOREIGN PATENT DOCUMENTS

| EP | 2 535 793 A1 | 12/2012 |
| EP | 2 793 110 A1 | 10/2014 |

(Continued)

*Primary Examiner* — Ryan A Lubit
(74) *Attorney, Agent, or Firm* — BakerHostetler (57) ABSTRACT

A touch surface includes an array of rows of electrodes, an input point on a row for injecting an input voltage ($V_{DRIVE}$), measuring an output voltage ($V_{SENSE}$) at a second point in the row, p being the number of pitch spacings of the array separating the two points, the portion of the array between the first point and the second point being akin to an electric dipole of resistance (R(p)) and of capacitance (C), the output voltage ($V_{SENSE}$) being equal to the product of the input voltage ($V_{DRIVE}$) and a transfer function represented by a complex function ($H_{SENSE}$). The measurement includes extracting the amplitude (G) and the phase ($\varphi$) from the transfer function; and calculating a hybrid function ($S(G, \varphi)$) of the amplitude and of the phase, the hybrid function minimizing a sum ($\Sigma$) defined by $$\Sigma_{i \in [0,p]} \left( \frac{\delta S}{\delta R} (G(R_i), \varphi(R_i)) \right).$$

8 Claims, 5 Drawing Sheets

(58) Field of Classification Search
CPC .... G06F 3/0445; G06F 3/04883; G06F 3/044;
G06F 3/0418; G06F 3/03545; G06F
1/1626
See application file for complete search history.

(56) References Cited

U.S. PATENT DOCUMENTS

| | | |
|---|---|---|
| 2016/0018921 A1 | 1/2016 | Matlick et al. |
| 2016/0161610 A1* | 6/2016 | Hiromi .................. G01S 17/36 |
| | | 250/341.8 |
| 2017/0123591 A1 | 5/2017 | Haga et al. |
| 2017/0212635 A1 | 7/2017 | Cordeiro et al. |
| 2017/0343386 A1* | 11/2017 | Tanaka ............... G01R 27/2605 |
| 2019/0187854 A1* | 6/2019 | Hosur .................. G06F 3/0414 |
| 2019/0302923 A1* | 10/2019 | Maru ..................... G06F 3/044 |
| 2020/0271745 A1* | 8/2020 | Das ....................... G01R 23/02 |
| 2020/0272301 A1* | 8/2020 | Duewer ................ H04J 3/0635 |
| 2020/0363891 A1* | 11/2020 | Yancey .................. G06F 3/044 |

FOREIGN PATENT DOCUMENTS

| | | |
|---|---|---|
| EP | 2 891 947 A1 | 7/2015 |
| FR | 3 009 099 A1 | 1/2015 |
| FR | 3 009 101 A1 | 1/2015 |

\* cited by examiner

Number of columns

TOUCH SURFACE WITH HYBRID TOUCH DETECTION

CROSS-REFERENCE TO RELATED APPLICATIONS

This application claims priority to foreign French patent application No. FR 1906957, filed on Jun. 27, 2019, the disclosure of which is incorporated by reference in its entirety.

FIELD OF THE INVENTION

The field of the invention is that of large touchscreens made of transparent conductive material having medium or high resistivity.

BACKGROUND

The majority of touchscreens operate by means of electronic detection. The touchscreens then consist of arrays of rows and columns of conductive electrodes. Touch detection touch is achieved by injecting electrical signals into the arrays of rows and columns and measuring the variations in the output signals caused by the one or more fingers of the user in contact with the touchscreen. It should be noted that, throughout the rest of the text, the terms touchpad and touchscreen are used interchangeably to refer to a device including a touch surface.

In a great many applications, the touchscreen is arranged on a viewing device for the controlling of same. As such, the array of electrodes should be as discreet as possible so as not to interfere with the image displayed.

The use of non-transparent metal electrodes, even when they are very thin, creates optical artefacts and they do not lend themselves easily to etching processes, which makes them more expensive. Reference is made, by way of example, to the use of "micromeshes" or of materials based on silver or carbon. Therefore, use is generally made of a transparent material to produce the electrodes so as to limit these problems.

The use of a transparent material is generally not well suited to analogue measurements which are sensitive to the attenuation caused by the resistivity of the materials used. Specifically, transparent materials have a much higher resistivity than metals. For example, indium tin oxide, known by the abbreviation "ITO", exhibits good transparency but average resistivity, of about 50 ohms per square.

In the case of touchscreens, what is sought is a signal caused by a capacitive variation of a few femtofarads, which entails a measurement at a high frequency of a few hundred kHz.

When the row is resistive, this measurement varies according to the location of the point of measurement. Thus, if this variation is measured at the end of a transparent row, the resistance of this row and the attenuation of the signal are maximum, a first-order RC being formed by the capacitance C to be measured and the resistance R of the row.

Sensitivity therefore decreases along a given column or a given row with increasing distance from the point at which the signal is injected. The touchpad is no longer uniformly sensitive. This loss of sensitivity may have severe consequences, such as resulting in missed detections when the hand of the user is gloved.

To partly overcome this drawback, it is preferable to inject the signals into the shortest electrodes, touchpads generally being rectangular.

To remedy this problem, a first solution consists in decreasing the resistivity of the ITO layer by increasing the thickness thereof, but this also decreases the transparency of the touchscreen.

A second solution consists in injecting the measurement signal on both sides of a given row. In this way there is a strong signal at both ends of the row.

However, this two-sided injection solution only shifts the problem. Sensitivity remains low in the middle of the pad, which is the most frequently used region. Additionally, this low sensitivity at the centre of the screen is worse for screens of large side.

Lastly, this dual injection also doubles the number of access tracks and doubles the connections.

These various drawbacks contribute to increasing the price of the touchpad, to increasing the size of its bezels, and to decreasing its reliability, which substantially reduces the competitiveness of the product and the value delivered to the user.

In addition, the principle of measurement also has an effect. Current products use a charge transfer method, which consists in measuring the charging time of a row, this method being called "self mode", or of a row/column intersection, this method being called "mutual mode".

To perform this type of measurement, sinusoidal signals may be injected, these then being amplitude-demodulated, the variation in amplitude being proportional to the capacitance produced by the touch from the user. This type of technology is known as "projected capacitive touch".

Although a little bit more complex to integrate into an electronic circuit such as an "ASIC" ("application-specific integrated circuit"), the frequency solution affords a certain number of advantages, which are described below:

In the field of electromagnetic compatibility, this type of sinusoidal signal is less polluting than a square wave signal. If necessary, the few rays emitted may be pushed out of the band of sensitivity of other electronic instruments.

Furthermore, the amplitude measurement carried out using synchronous demodulation provides relatively good immunity to interference.

However, the great advantage of the frequency solution over techniques used with standard or "COTS" ("commercial off-the-shelf") controllers is the possibility of using different signal frequencies.

This advantage has multiple applications. The following patents describe some of them.

Patent EP 2 535 793, entitled "Multi-touch sensing device with multi-frequency capacitive sensing", describes a touch device in which the use of two different frequencies allows ghost touches to be eliminated in the case of a "dual-touch" application;

Patent FR 3 009 099, entitled "Capacitive touchscreen device with multi-touchscreens", describes a touchscreen comprising two juxtaposed regions, each region using different frequencies in order to avoid interference;

Patent EP 2 793 110, entitled "Multi-touch sensing device with multi-frequency capacitive sensing comprising means for failure detection", describes a device employing different frequencies to measure the integrity of the pad and to detect broken rows;

Patent FR 3 009 101, entitled "Capacitive touch device including touch simulation means", describes a device using specific frequencies for the simulation of touches;

Patent EP 2 891 947, entitled "Capacitive dongle for display devices comprising a capacitive touch-sensitive surface", describes a data transfer device in contact with a touchscreen employing a set of frequencies different from those of the touchscreen.

More specifically, the measurement of a touch on a projective capacitive touchpad, in mutual mode, resembles an electric dipole which receives at its input a sinusoidal electrical signal called "Drive" and generates at its output a modulated electrical signal called "Sense".

Figure 1:
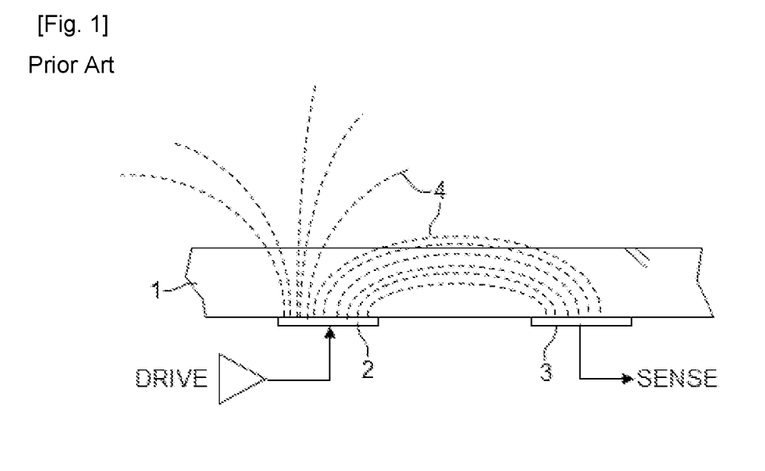
FIG. 1 shows the output signal in a touchpad according to the prior art in the absence of a touch from the user.
Figure 2:
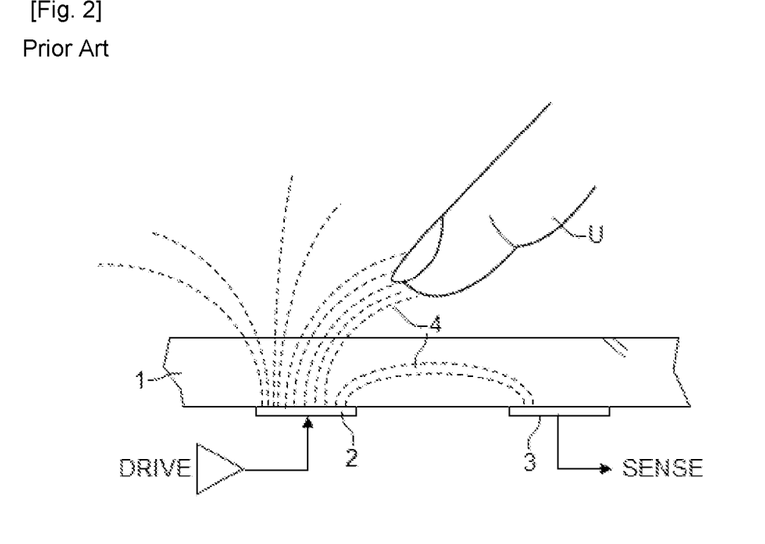
FIG. 2 shows the output signal in a touchpad according to the prior art in the presence of a touch from the user.

This principle is illustrated in FIGS. 1 and 2 which show the variations in the output signal depending on whether the finger U of the user is touching the touchpad or not. These two figures show a simplified fraction of a touchpad 1 made of glass including an array of electrodes. In FIGS. 1 and 2, the fraction shown includes two electrodes 2 and 3 arranged beneath the glass pad. The first electrode 2 delivers the input signal and the second electrode 3 carries away the output signal. The curved dashed lines 4 represent the field lines generated by the input signal.

As can be seen in FIG. 1, if the user is not touching the touchpad, a substantial portion of the electric field lines is picked up by the electrode 3. Conversely, if the finger of the user is touching the touchpad, these field lines are largely picked up by the finger.

By amplitude-demodulating the output signal, a value representative of the touch is obtained. Generally speaking, the dipole is equivalent to a series RC filter. For a given frequency, the attenuation of the signal increases with increasing value of the resistance R. However, the increase in the resistance also brings about a variation in the phase shift between the output signal and the input signal.

Figure 3:
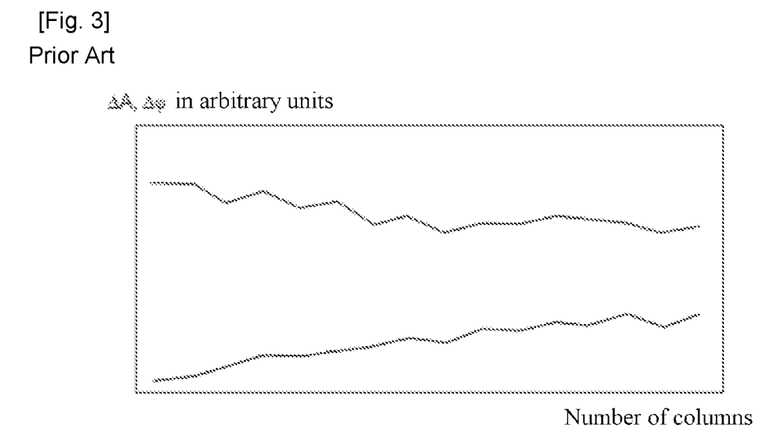
FIG. 3 shows the variations in the attenuation and in the phase shift of the output signal according to the distance of the column at which the signal is extracted in a touchpad according to the prior art.

By way of example, FIG. 3 shows the variations in the attenuation of the signal and the associated phase shift according to the distance of the column at which the signal is extracted. The attenuation $\Delta A$ and the phase shift $\Delta \varphi$ are shown in arbitrary units, and the phase shift curve is a fine line. As can be seen in this figure, the change in the attenuation is the inverse of that of the phase shift.

In mutual mode, a signal of the same nature is encountered, but with an attenuation of the amplitude and a phase lag which varies in the two dimensions of the touchpad.

SUMMARY OF THE INVENTION

The detection of the signal according to the invention is based on this principle. In order to remedy the attenuation of the output signal depending on the location of the touch, instead of just analysing the amplitude of the output signal, what is analysed is a hybrid function combining the amplitude and the phase shift of the output signal such that this hybrid function is invariant along the entire length of the rows or columns of the touchpad.

More specifically, the subject of the invention is a touch surface including an array of rows of electrodes, means for injecting, at an input point on a row, at least one sinusoidal input voltage ($V_{DRIVE}$) transmitted at a determined frequency and of known amplitude and phase, electronic means for measuring an output voltage ($V_{SENSE}$) at a second point in said row, p denoting the minimum number of pitch spacings of the array separating the first point from the second point, the portion of the array between the first point and the second point being akin to an electric dipole of resistance (R(p)) and of capacitance (C), the output voltage ($V_{SENSE}$) being equal to the product of the input voltage ($V_{DRIVE}$) and a transfer function represented by a complex function ($H_{SENSE}$), characterized in that said measurement means include the following electronic means:

electronic means for extracting the gain (G) and the phase ($\varphi$) from the complex transfer function;

electronic means for calculating a hybrid function (S(G, $\varphi$)) of said amplitude and of said phase, said hybrid function minimizing the sum ($\Sigma$) as defined by Equation (1):

$$\Sigma_{i \in [0, p]} \left( \frac{\delta S}{\delta R} (G(R_i), \varphi(R_i)) \right) \quad \text{Equation 1}$$

S(G($R_i$),$\varphi$($R_i$)) corresponding to a touch at the point i on the row means for determining, from the value of the hybrid function (S), whether this value is representative of a touch on the second point on the touch surface.

Advantageously, the change in the complex function ($H_{SENSE}$) in the complex plane being akin to an ellipse of eccentricity (e), the hybrid function (S(G, $\varphi$)) is equal to the production of the amplitude G and a function k($\varphi$) as defined by Equation (2):

$$k(\varphi) = \sqrt{1 + \frac{e^2}{1 - e^2} \sin^2 \varphi} \quad \text{Equation 2}$$

Advantageously, the electronic extraction means include:
a generator of two digital signals transmitted at the same frequency as the input voltage, the two signals being in quadrature;
an analogue-to-digital converter of the output voltage delivering a sampled digital voltage;
two multipliers for multiplying the sampled digital voltage by each of the two digital signals in quadrature;
two integrators for integrating, over a number of periods greater than one, the two signals from the two multipliers;
calculating means making it possible, on the basis of the preceding two integrated signals, to calculate the gain (G) and the phase ($\varphi$) of the transfer function.

Advantageously, the measurement means include means for electronically filtering the hybrid function (S(G, $\varphi$)).

DETAILED DESCRIPTION

The touch surface according to the invention includes an array of rows and columns of electrodes. The touch measurement is a "projected capacitive" touch measurement, It operates in mutual mode. The pulse of the transmission signals is denoted by ω. Generally, the frequencies corresponding to this pulse are between 50 kHz and 1 MHz.

By way of non-limiting example, a touchpad according to the invention has a diagonal that is between 400 millimetres and 800 millimetres. The pitch spacing of the array of electrodes is generally between 5 millimetres and 7 millimetres.

For example, a touchpad in 16:10 format with a height of 203 millimetres and a length of 324 millimetres has 30 rows and 48 columns with a pitch spacing of 7 millimetres. The diagonal of this touchpad is about 400 millimetres.

Figure 4:
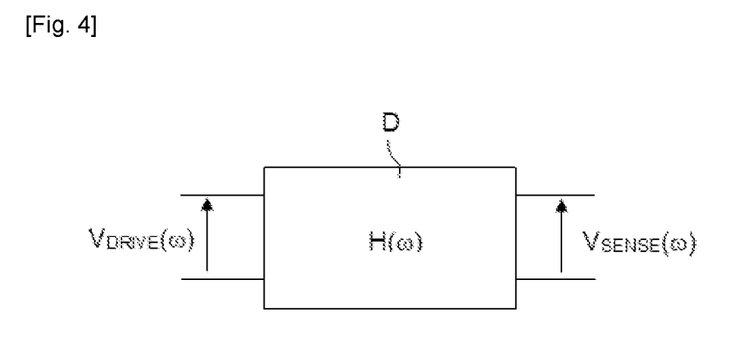
FIG. 4 shows an electronic dipole representing a touch region of a touchpad according to the invention.

FIG. 4 shows an electronic dipole D representing a touch region of the touchpad. The input signal for this dipole D is the injection $V_{DRIVE}(w)$ and the output signal thereof is the measurement $V_{SENSE}(\omega)$. This dipole D is characterized by its transfer function $H_{SENSE}(\omega)$.

Figure 5:
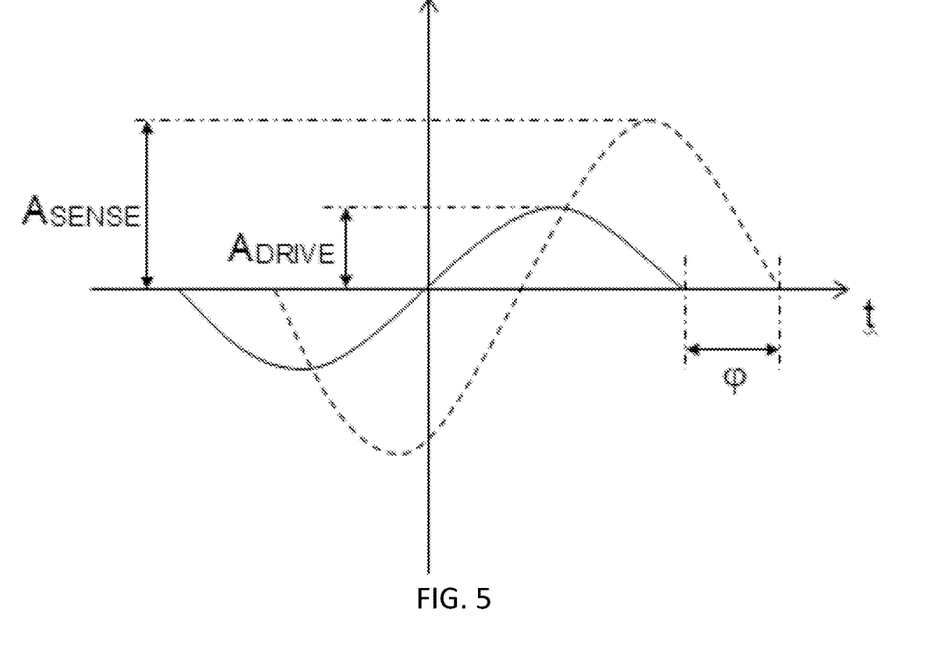
FIG. 5 shows the variations in the attenuation and in the phase shift of the output signal in a touchpad according to the invention.

The variations in amplitude of the input and output signals with time are shown in FIG. 5. The input signal is represented by a solid line and the output signal is represented by a dashed line in this FIG. 5. As can be seen, the output signal has an amplitude $A_{SENSE}$ different from that $A_{DRIVE}$ of the input signal and it is also phase-shifted by a phase shift φ. Therefore, the transfer function $H_{SENSE}(\omega)$ may be expressed, in complex notation, in the form: $H_{SENSE}(\omega) = G_{SENSE} \cdot e^{j\varphi SENSE}$, $G_{SENSE}$ representing the gain of the dipole corresponding to the ratio of the input amplitude to the output amplitude and $\varphi_{SENSE}$ the phase of the dipole.

Figure 6:
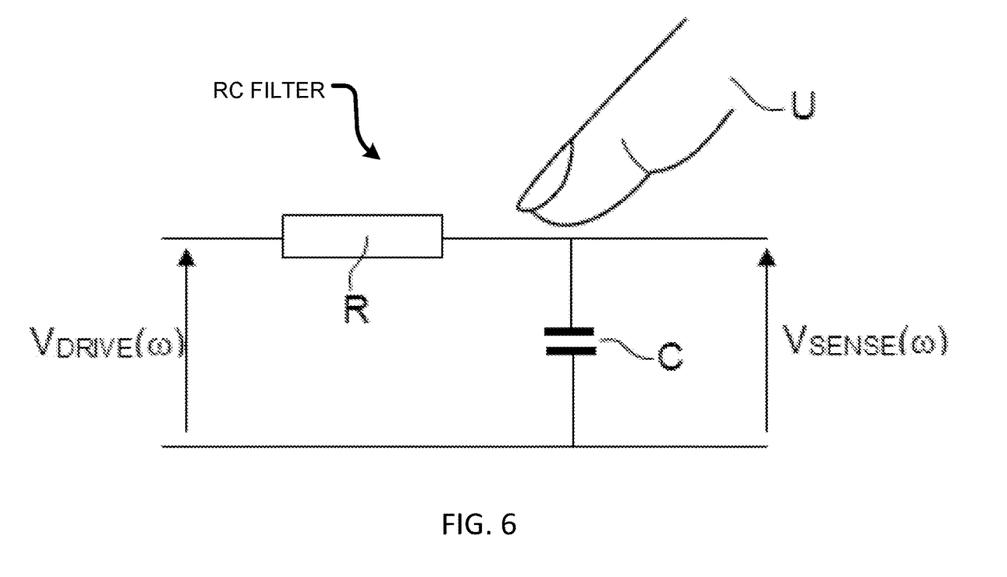
FIG. 6 shows the above electronic dipole in the form of an RC network in a touchpad according to the invention.

As can be seen in FIG. 6, D may be likened to a series RC network, where C is the resultant of the capacitance produced by the operator U and the mutual coupling capacitance at the point of contact and R the resistance at the point of contact.

In this case, the quantities $G_{SENSE}$ and $\varphi_{SENSE}$ satisfy the following two equations:

$$G_{SENSE} = \frac{1}{\sqrt{1 + (\omega RC)^2}} \quad \text{Equation 3}$$

$$\varphi_{SENSE} = \tan^{-1}(-\omega RC) \quad \text{Equation 4}$$

In the devices of the prior art, $V_{SENSE}$ is measured by measuring the charging time of the capacitance C, using what is called the charge transfer method. Therefore, only the gain $G_{SENSE}$ of the dipole is measured. According to Equation 3, it can be seen that the gain is equal to 1 if the capacitance C or resistance R are zero.

In other words, at the start of the row, the attenuation is zero, and as the distance from the edge of the touchpad increases, the gain decreases with increasing resistance R.

The measurement means of the touch surface according to the invention include a device that makes it possible to simultaneously obtain the amplitude and the phase of the dipole D. At the start of the row, the resistance is zero, which leads to a phase shift of zero. As the distance from the edge of the row increases, a phase lag results from the increase in the resistance R. Thus, unlike the gain $G_{SENSE}$ which decreases with the resistance R, the phase shift $\varphi_{SENSE}$ increases therewith.

The core of the invention is to exploit these two measurements and to create a hybrid function $S(G, \varphi)$ which, by combining the gain G and the phase shift φ, stays practically invariant regardless of the location of the point of measurement.

If p denotes the number of pitch spacings of the array separating the first point, of application of the input signal, from the second point, of the measurement signal, the resistance between these two points being denoted by R(p), the function S should be such that it satisfies Equation 1 below:

$$\Sigma_{i \in [0,p]} \left( \frac{\delta S}{\delta R}(G(R_i), \varphi(R_i)) \right) \quad \text{Equation 1}$$

$S(G(R_i), \varphi(R_i))$ corresponding to the value of the hybrid function S at the point i on the row located between the first point and the second point Additionally, $$S(G(0), \varphi(0)) = (0)$$

the function S may therefore be calculated experimentally. S may in the first instance be a straightforward addition, but the nature and size of the pad, and the measurement frequencies used as well as parasitic capacitive coupling, generally mean that the function S is not, in the second instance, linear.

Figure 7:
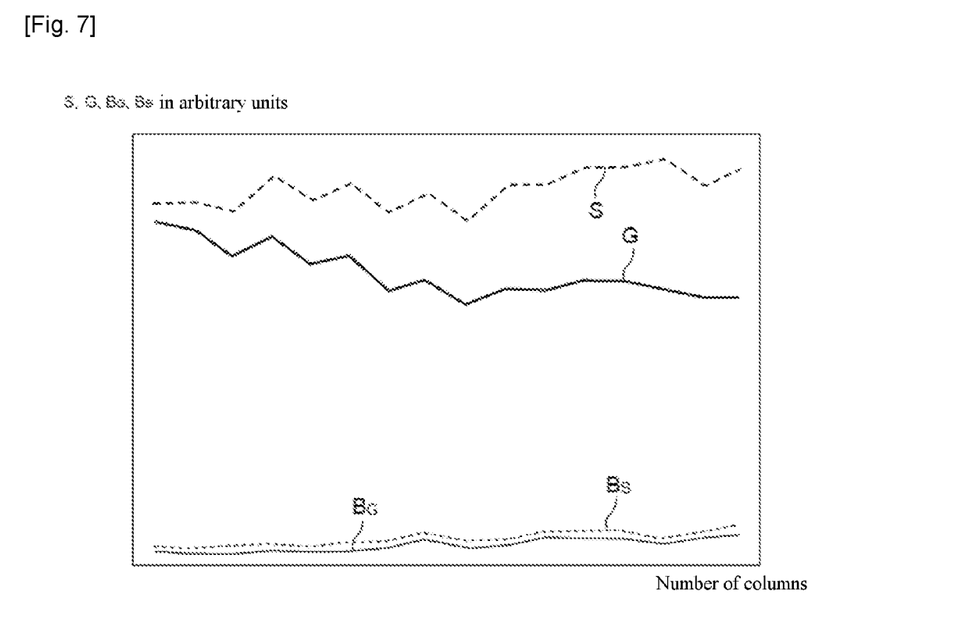
FIG. 7 shows the hybrid signal according to the distance of the column at which the signal is extracted in a touchpad according to the invention.

Thus, FIG. 7 shows, with increasing distance between the input point and the measurement point, the gain G, the hybrid function S equal to the sum of the gain and of the corresponding phase shift, the noise of the gain $B_G$ and the noise $B_S$ of the hybrid function S, the gain G and its associated noise $B_G$ are represented by solid lines and the hybrid function S and its associated noise $B_S$ by dashed lines.

As can be seen in FIG. 7, the signal, hybridized in this way, is no longer attenuated along the row; indeed, it even tends to increase. However, the noise increases too. Consequently, it is preferable to use a non-linear model integrating the noise.

Figure 8:
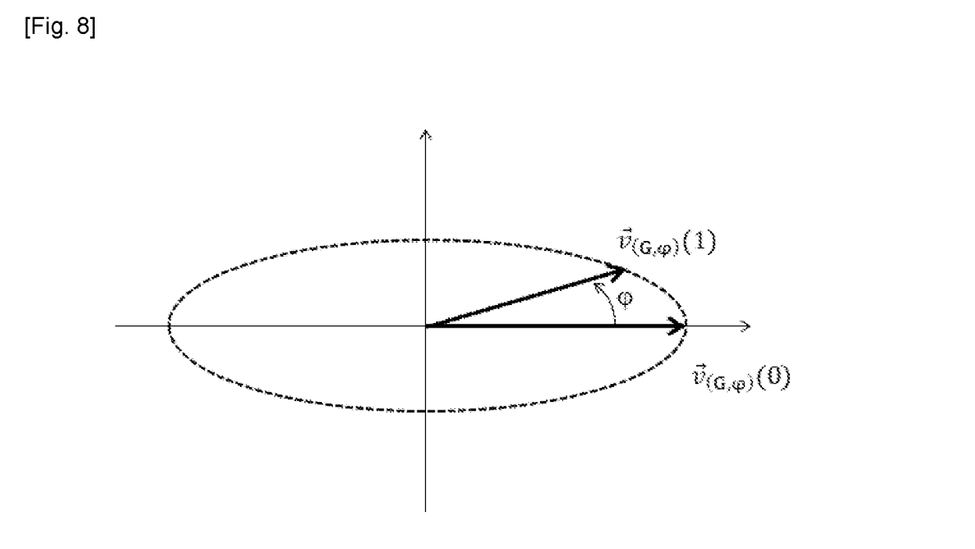
FIG. 8 shows a vector representative of the output signal before hybridization.

The change in the gain G and in the phase shift φ in the event of a touch along the pad is akin to an elliptical vector behaviour. If $\vec{v}_{(G,\varphi)}$ denotes the vector of which the polar coordinates are G and φ and the affix of which is therefore the complex number $Ge^{i\varphi}$, then it is seen that given the maximum value of the phase shift φ, it is possible to provide a good approximation of the spatial evolution of this vector along the pad via the start of an ellipse: FIG. 8 shows an ellipse of this type. The horizontal arrow represents the vector $\vec{v}_{(G,\varphi)}(0)$ at the start of the touchpad and the sloping arrow represents the vector $\vec{v}_{(G,\varphi)}(1)$ at the end of the touchpad.

The affix of $\vec{v}_{(G,\varphi)}(0)$ has a value of $G_{MAX} \cdot e^{i0}$ and the affix of $\vec{v}_{(G,\varphi)}(1)$ has a value of $G_{MIN} \cdot e^{i\varphi MAX}$.

The length of the major axis of the ellipse is given by the maximum value of the gain G, reached at the start of the pad, and its eccentricity e is identified by measurements taken along the pad.

The objective of the hybrid function is to keep the maximum value of the gain G constant, hence to modify the norm of $\vec{v}_{(G,\varphi)}$ to bring it to the length of the major axis. Exactly speaking, G must therefore be replaced with the hybrid function S(G, φ) the value of which, in the present case, is G·k(φ) where:

$$k(\varphi) = \sqrt{1 + \frac{e^2}{1-e^2}\sin^2\varphi}$$

Figure 9:
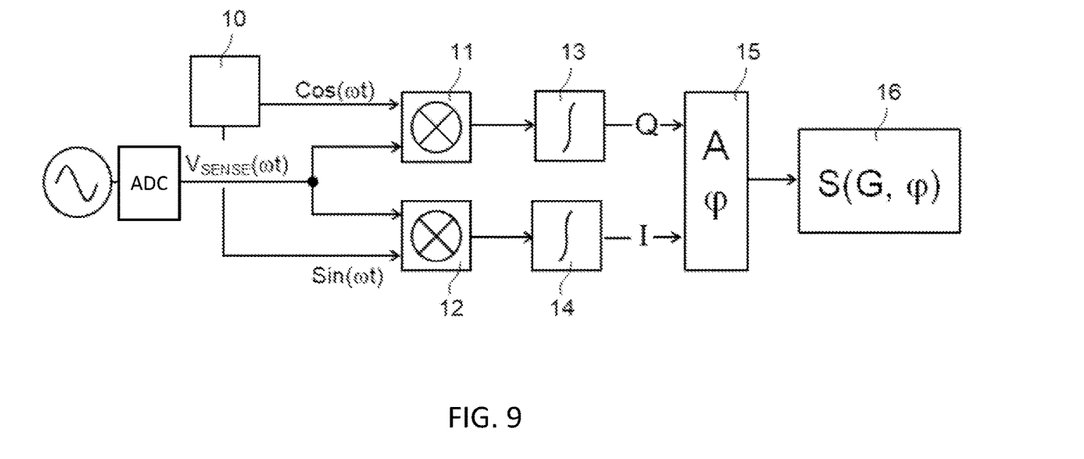
FIG. 9 shows a vector representative of the output signal after hybridization.

In this case, if the hybrid function S(G, φ) is represented using the same vector notation as above, this function S describes a portion of a circle as can be seen in FIG. 9. The radius of the circle has a value of $G_{MAX}$.

The accounting for the noise, and in particular the correlation between the noise on the gain G and the noise on the phase shift φ, may be processed after measuring these noise values and determining their spectral and amplitude characteristics with a view to optimally decreasing the noise of the product G·k(φ). By way of example, this processing may consist of matched filtering or temporal mismatch.

The electronic calculating means of the touch surface should therefore be capable of, on the basis of the knowledge of the output signal $V_{SENSE}(\omega)$, extracting its amplitude and its phase. On the basis of these two items of information, it is possible to calculate the gain G and then the hybrid function S.

Figure 10:
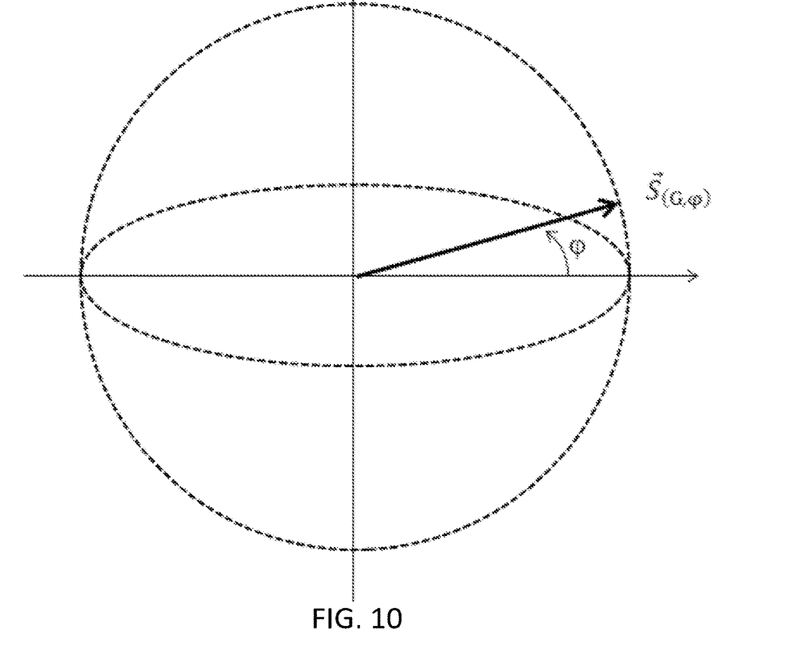
FIG. 10 shows an electronic block diagram of the function for extracting the amplitude and the phase from the output signal.

Measuring the amplitude and the phase does not present any particular problems for a person skilled in the art. By way of example, the block diagram of FIG. 10 shows an electronic embodiment of this extraction function. This electronic function includes:

An analogue-to-digital converter of the output voltage delivering a sampled digital voltage as shown in FIG. 10. The number of samples should cover a plurality of periods of the pulse ω;

A generator 10 of two digital signals transmitted at the same pulse ω as the input voltage $v_{SENSE}$, the two signals being in quadrature. These signals are represented by the functions Cos(ωt) and Sin(ωt) In FIG. 10;

Two multipliers 11 and 12 for multiplying the sampled digital voltage by each of the two digital signals in quadrature;

Two integrators 13 and 14 for integrating, over a number of periods greater than one, the two signals from the two multipliers 11 and 12; The first output signal from the first integrator is denoted by Q and the second output signal is denoted by I;

Calculating means 15 make it possible, on the basis of the preceding two integrated signals, to calculate the amplitude (A) and the phase (φ) of the input signal $V_{SENSE}$ according to the following formulas:

$$A = \sqrt{I^2 + Q^2} \text{ and } \varphi = \tan^{-1}\left(\frac{I}{Q}\right)$$

Knowing the amplitude and the phase of the output signal, it is then straightforward to determine the gain G, and then the hybrid function S(G, φ).

The advantages of the measurement means according to the invention are substantial. Specifically, the hybrid function makes it possible to obtain a signal that is only representative of a touch, without being dependent on the resistive component of the pad.

It is thus possible to use the entire area of the touchpad with gloves without missed touch detections.

This solution makes it possible to use standard touchpads by avoiding the addressing of both sides of the pad. It allows the use of low-cost transparent conductive materials such as ITO.

Additionally, the hybridization allows the measurement noise to be reduced quadratically, while the signal is increased by the value of the phase, which affords the possibility of increasing the signal-to-noise ratio by 6 dB.

The invention claimed is:

1. A touch surface comprising:
   an array of rows of electrodes,
   an input point on a row for injecting at least one sinusoidal input voltage ($V_{DRIVE}$) transmitted at a determined frequency and of known amplitude and phase,
   a measurement device configured to measure an output voltage ($V_{SENSE}$) at a second point in said row, p denoting a minimum number of pitch spacings of the array separating a first point from the second point, a portion of the array between the first point and the second point being characterized as an electric dipole of resistance (R(p)) and of capacitance (C), the output voltage ($V_{SENSE}$) being equal to a product of the input voltage ($V_{DRIVE}$) and a complex transfer function represented by a complex function ($H_{SENSE}$),
   wherein said measurement device includes electronic means for extracting a gain (G) and a phase (φ) from the complex transfer function,
   wherein said measurement device being further configured to calculate a hybrid function (S(G, φ)) of said amplitude and of said phase, said hybrid function minimizing a sum (Σ) as defined by Equation (1):

$$\Sigma_{i\in[0,p]}\left(\frac{\delta S}{\delta R}(G(R_i), \varphi(R_i))\right) \qquad \text{Equation 1}$$

S(G($R_i$),φ($R_i$)) corresponding to a touch at the point i on the row; and
   wherein said measurement device being further configured to determine, from a value of the hybrid function (S), whether the value is representative of a touch on the second point on the touch surface.

2. The touch surface according to claim 1, wherein:
   a change in the complex function ($H_{SENSE}$) in a complex plane being characterized as an ellipse of eccentricity (e), and
   the hybrid function (S(G, φ)) is equal to the product of the amplitude G and a function k(φ) as defined by Equation (2):

$$k(\varphi) = \sqrt{1 + \frac{e^2}{1-e^2}\sin^2\varphi}. \qquad \text{Equation 2}$$

3. The touch surface according to claim 1, wherein the electronic extraction means includes:
   a generator of two digital signals transmitted at the same frequency as the input voltage, the two signals being in quadrature;

an analogue-to-digital converter of the output voltage delivering a sampled digital voltage;

two multipliers for multiplying the sampled digital voltage by each of the two digital signals in quadrature; and two integrators for integrating, over a number of periods greater than one, the two signals from the two multipliers, wherein said measurement device being further configured to calculate, on a basis of the preceding two integrated signals, to calculate the gain (G) and the phase (φ) of the transfer function.

4. The touch surface according to claim 1, wherein the measurement device includes an electronic filter configured to filter the hybrid function (S(G, φ)).

5. A touch surface comprising:

an array of rows of electrodes, an input point on a row for injecting at least one sinusoidal input voltage ($V_{DRIVE}$) transmitted at a determined frequency and of known amplitude and phase, a measurement device configured to measure an output voltage ($V_{SENSE}$) at a second point in said row, p denoting a minimum number of pitch spacings of the array separating a first point from the second point, a portion of the array between the first point and the second point being characterized as an electric dipole of resistance (R(p)) and of capacitance (C), the output voltage ($V_{SENSE}$) being equal to a product of the input voltage ($V_{DRIVE}$) and a complex transfer function represented by a complex function ($H_{SENSE}$), wherein said measurement device being further configured to extract a gain (G) and a phase (φ) from the complex transfer function, wherein said measurement device being further configured to calculate a hybrid function (S(G, φ)) of said amplitude and of said phase, said hybrid function minimizing a sum (Σ) as defined by Equation (1):

$$\Sigma_{i \in [0,p]} \left( \frac{\delta S}{\delta R} (G(R_i), \varphi(R_i)) \right) \quad \text{Equation 1}$$

$S(G(R_i), \varphi(R_i))$ corresponding to a touch at the point i on the row; and wherein said measurement device being further configured to determine, from a value of the hybrid function (S), whether the value is representative of a touch on the second point on the touch surface.

6. The touch surface according to claim 5, wherein:

a change in the complex function ($H_{SENSE}$) in a complex plane being characterized as an ellipse of eccentricity (e), and the hybrid function (S(G, φ)) is equal to the product of the amplitude G and a function k(φ) as defined by Equation (2):

$$k(\varphi) = \sqrt{1 + \frac{e^2}{1-e^2} \sin^2 \varphi} . \quad \text{Equation 2}$$

7. The touch surface according to claim 5, wherein said measurement device comprising:

a generator of two digital signals transmitted at the same frequency as the input voltage, the two signals being in quadrature;

an analogue-to-digital converter of the output voltage delivering a sampled digital voltage;

two multipliers for multiplying the sampled digital voltage by each of the two digital signals in quadrature; and two integrators for integrating, over a number of periods greater than one, the two signals from the two multipliers, wherein said measurement device being further configured to calculate, on a basis of the preceding two integrated signals, the gain (G) and the phase (φ) of the transfer function.

8. The touch surface according to claim 5, wherein the measurement device includes an electronic filter configured to filter the hybrid function (S(G, φ)).

* * * * *